United States Patent
Powell, Jr. et al.

(10) Patent No.: US 12,230,973 B2
(45) Date of Patent: *Feb. 18, 2025

(54) AIR-COOLED WIRELESS POWER TRANSMISSION SYSTEM

(71) Applicant: Aptiv Technologies AG, Schaffhausen (CH)

(72) Inventors: George Powell, Jr., Cortland, OH (US); James Cook, Poland, OH (US); Evan Wallace, Shelby Township, MI (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,385

(22) Filed: Oct. 31, 2023

(65) Prior Publication Data

US 2024/0063661 A1    Feb. 22, 2024

Related U.S. Application Data

(63) Continuation of application No. 17/721,862, filed on Apr. 15, 2022, now Pat. No. 11,848,565.

(60) Provisional application No. 63/175,769, filed on Apr. 16, 2021.

(51) Int. Cl.
   *H02J 50/10* (2016.01)
   *H02J 7/00* (2006.01)

(52) U.S. Cl.
   CPC .......... *H02J 50/10* (2016.02); *H02J 7/00309* (2020.01)

(58) Field of Classification Search
   CPC .............................. H02J 50/10; H02J 7/00309
   USPC ......................................................... 307/104
   See application file for complete search history.

(56) References Cited

U.S. PATENT DOCUMENTS

| 11,848,565 B2* | 12/2023 | Powell, Jr. | H02J 50/10 |
| 2009/0096413 A1* | 4/2009 | Partovi | H02J 7/0013 |
| | | | 320/108 |
| 2011/0050164 A1* | 3/2011 | Partovi | H02J 50/402 |
| | | | 320/108 |

(Continued)

FOREIGN PATENT DOCUMENTS

CN    112311033 A    2/2021

OTHER PUBLICATIONS

"Communication Pursuant to EPC Rule 69 Mailed on Oct. 24, 2022", 2 Pages.

(Continued)

*Primary Examiner* — Alfonso Perez Borroto
(74) *Attorney, Agent, or Firm* — Billion & Armitage

(57) ABSTRACT

A wireless power transmitter includes a charging coil, an electronics housing, and a top side. The charging coil housing houses a charging coil and includes a top surface, wherein the charging coil wirelessly transmits power to a receiver placed on the top surface of the charging coil housing. The electronics housing houses one or more electronics and a fan. The top side is located adjacent to the electronics housing, wherein a top surface of the top side faces a bottom surface of the receiver. An intake cooling path is defined by a region between the bottom surface of the receiver and the top surface of the top side and an exhaust cooling path is located on a side of the charging coil housing opposite the intake cooling path and defined by a region between the receiver and the top surface of the top side.

19 Claims, 3 Drawing Sheets

(56) References Cited

U.S. PATENT DOCUMENTS

| | | | | |
|---|---|---|---|---|
| 2014/0007594 A1* | 1/2014 | Lofy | ............... | H05K 7/20209 |
| | | | | 62/3.2 |
| 2014/0062392 A1* | 3/2014 | Lofy | ............... | H05K 7/20136 |
| | | | | 320/108 |
| 2017/0164513 A1* | 6/2017 | Lofy | ............... | H05K 7/20136 |
| 2017/0164515 A1* | 6/2017 | Lofy | ............... | H02J 7/0044 |
| 2018/0199464 A1* | 7/2018 | Lofy | ............... | H02J 50/10 |
| 2019/0261535 A1* | 8/2019 | Lofy | ............... | H05K 7/20136 |
| 2021/0050741 A1* | 2/2021 | Pinkos | ............... | H01F 27/025 |
| 2022/0161176 A1* | 5/2022 | Kim | ............... | B01D 46/0047 |

OTHER PUBLICATIONS

"Extended European Search Report mailed on Sep. 14, 2022", 6 Pages.

* cited by examiner

AIR-COOLED WIRELESS POWER TRANSMISSION SYSTEM

CROSS REFERENCE TO RELATED APPLICATION(S)

This patent application is a continuation application of U.S. application Ser. No. 17/721,862, filed Apr. 15, 2022, which claims the benefit of U.S. Provisional Application No. 63/175,769, filed Apr. 16, 2021, which is incorporated by reference in its entirety.

TECHNICAL FIELD

The invention generally relates to a wireless power transmission system, particularly to an air-cooled wireless power transmission system for charging batteries in a consumer electronic device.

BACKGROUND

Typical active cooling schemes for automotive wireless chargers use a radial fan mounted on the wireless charging module to force air through an air duct built into the interface surface of the module between the wireless power transmitter and the wireless power receiver. During charging, this airflow typically either blows directly onto the receiver through holes in the interface surface to cool the receiver or blows under the interface surface to insulate the receiver from heat generated by the transmitter.

Airflow configurations that intake air from spaces below the charger can be subject to higher cooling air temperatures as this space is typically below the vehicle console/trim and is not climate controlled. Intake air from spaces below the charger may therefore contain hotter air when the charger is being used in high outside temperature conditions, reducing cooling efficiency in the scenario where the cooling is needed most. Airflow configurations that intake air from the climate-controlled cabin and pass it around the phone to exhaust below the module do not have this problem, but these configurations usually cause the transmitter module to have larger packaging size, especially in the z-height/direction, in order to fit the necessary mounts and ducting to maintain low enough system pressure for the fan to generate sufficient cooling airflow.

These problems are most likely understood by most competitors and customers who use active cooling in their transmitter designs. These issues can be minimized with clever design or more expense, but to a degree they are innate to the application.

SUMMARY

According to one aspect, a wireless power transmitter includes a charging coil, an electronics housing, and a top side. The charging coil housing houses a charging coil and includes a top surface, wherein the charging coil wirelessly transmits power to a receiver placed on the top surface of the charging coil housing. The electronics housing houses one or more electronics and a fan. The top side is located adjacent to the electronics housing, wherein a top surface of the top side faces a bottom surface of the receiver. An intake cooling path is defined by a region between the bottom surface of the receiver and the top surface of the top side and an exhaust cooling path is located on a side of the charging coil housing opposite the intake cooling path and defined by a region between the receiver and the top surface of the top side.

According to another aspect, a wireless power transmitter includes a charging coil housing that houses a charging coil and an electronics housing having a top side and an enclosure for housing electronics and a fan. The fan operates to draw intake cooling airflow from a first side of the charging coil housing and exhausts cooling airflow to a second side of the charging coil housing.

According to another aspect, a wireless power transmitter includes a charging coil housing that houses a charging coil and an electronics housing that includes a top side and an enclosure for housing electronics and a fan, wherein the fan draws intake cooling airflow from a first side of the charging coil housing through an intake cooling path defined between the charging coil housing and an opposing surface and exhausts cooling airflow to a second side of the charging coil housing through an exhaust cooling path defined between the charging cooling housing and an opposing surface.

BRIEF DESCRIPTION OF THE DRAWINGS

The present invention will now be described, by way of example with reference to the accompanying drawing, in which.

DETAILED DESCRIPTION

The problems of poor system intake air quality and excessive height (the z-axis dimension according to SAE J670) that are common to prior forced air flow active cooling configurations in automotive wireless power transmitters may be solved by implementing an active cooling fan in an inline fan configuration that draws conditioned cabin air around one side of the wireless power receiver, e.g. a cellular telephone or other consumer electronics device, at the interface surface between the transmitter and receiver and exhausts this air around the other side of the receiver to improve charging performance of the wireless power receiver by reducing or eliminating thermal shutdowns and optimize packaging in automotive wireless power transmitters, such as a MagSafe® wireless power transmitter licensed by Apple, Inc. of Cupertino, CA.

Figure 1A:
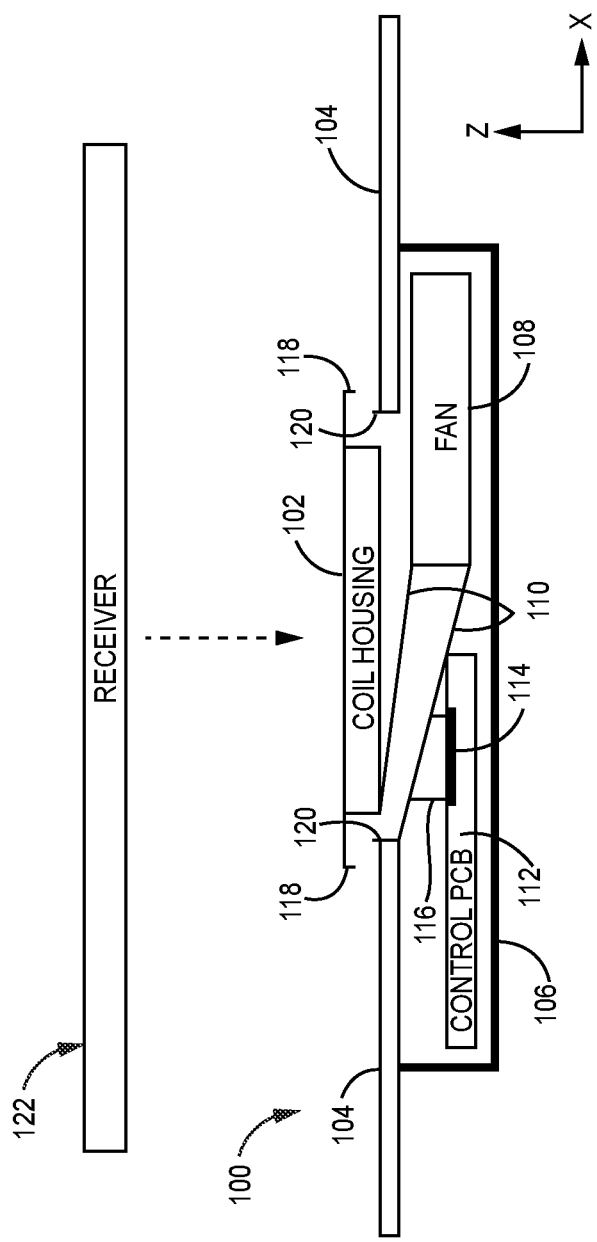
FIGS. 1A and 1B are schematic side views of an air-cooled wireless power transmission system in accordance with an embodiment of the invention.
Figure 1B:
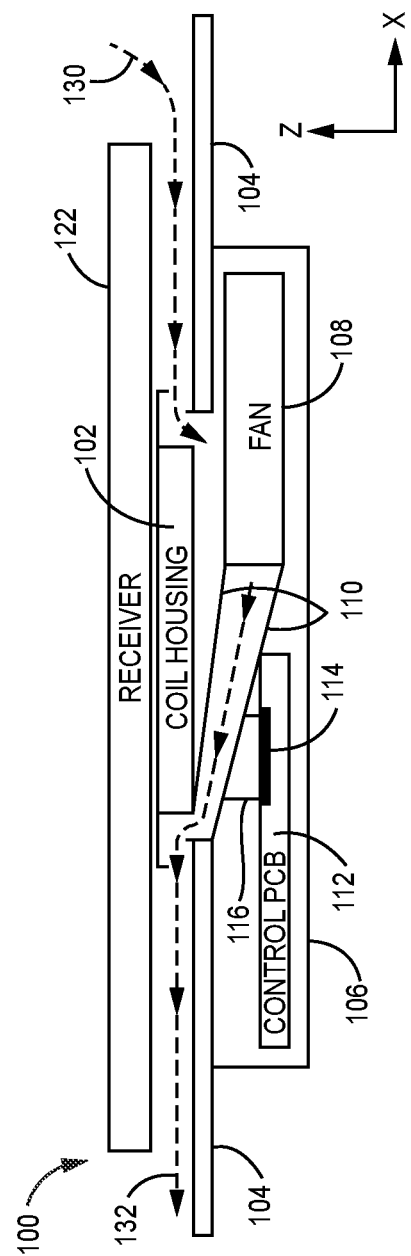

FIGS. 1A and 1B are schematic side views of the automotive wireless power transmitter 100 according to some embodiments, which includes a charging coil housing 102, electronics housing 106, fan 108, air ducts 110, control printed circuit board (PCB) 112, integrated controller circuit 114, and thermally conductive material 116. The charging coil housing 102 houses a charging coil (not shown) that is configured to provide wireless charging power to a receiver 122 placed adjacent to the charging coil housing 102. Typically, the surface area associated with the charging coil—as well as the charging coil housing 102 that houses the charging coil—is less than the surface area of the receiver 122 (i.e., the smartphone or tablet) being charged such that a significant portion of the receiver 122 extends beyond the charging coil. As discussed in more detail below, in some embodiments, the bottom surface of the receiver 122 defines a portion of the intake cooling path 130 and/or exhaust cooling path 132.

In some embodiments, the electronics housing 106 includes walls for enclosing the electronics associated with the automotive wireless power transmitter 100, including PCB 112, integrated controller circuit 114 and the fan 108. In some embodiments, the electronics housing 106 includes a top side or portion 104 of the electronics housing 106 that faces or opposes the bottom surface of the receiver 122. As shown in more detail with respect to FIG. 1B, a gap or space is provided between the bottom surface of the receiver 122 and a top surface of the top side or portion 104 and the gap or space defines the intake cooling path 130 and/or exhaust cooling path 132. In some embodiments, the top side or portion 104 is separate from the electronics housing 106. For example, the top side or portion 104 may be included as part of a console or trim associated with the vehicle, wherein the electronics housing 106 may be located adjacent to the top side or portion 104. Although not shown in this view, the charging coil housing 102 is connected to and supported by the electronics housing 106 on the sides of the coil not shown in FIGS. 1A, 1B. In some embodiments, the charging coil housing 102 and the top side 104 are approximately equal to one another in the vertical direction (i.e., in the z direction). In other embodiments, the charging coil housing 102 may be raised slightly relative to the top side 104. In both embodiments, however, a gap exists between the charging coil housing 102 and the top side 104 of the electronics housing 106 to provide a path for cooling airflow as described in more detail below.

During operation, the receiver 122 (e.g., cell phone or other device configured to receive wireless charging power) is placed along a top surface of the charging coil housing 102. Charging power is provided wirelessly from the charging coil to the receiver 122, e.g., a MagSafe® wireless power transmitter. In some embodiments, additional magnets or other mechanical features may be utilized to ensure the charging coil within the charging coil housing 102 is properly aligned with the receiver 122. Electronics housing 106 provides an enclosure for retaining and protecting electrical components associated with the wireless power transmitter 100, including control PCB 112, integrated controller circuit 114, and fan 108. Control PCB 112 and integrated controller circuit 114 are configured to selectively provide power received from the vehicle (or other power source) to the charging coil. In some embodiments, this may include converting direct current (DC) power received from the vehicle to alternating current (AC) provided to the charging coil located within the charging coil housing 102. In some embodiments, control PCB 112 and integrated controller circuit 114 also provide command instructions to the fan 108 (e.g., On/Off).

Fan 108 is utilized to provide cooling airflow to remove thermal energy associated with the wireless power transmitter 100 and/or receiver 122. Intake cooling airflow is drawn from a first side of the charging coil housing 102 through an intake cooling path 130 and exhaust cooling airflow is exhausted on the opposite side of the charging coil housing 102 through an exhaust cooling path 132. This may be referred to as inline cooling as both the intake cooling airflow and exhaust cooling airflow act to provide cooling. The fan 108 is located within the housing enclosure, beneath the charging coil housing 102 in the negative z direction. Cooling is provided via airflow passing through the intake and exhaust cooling paths 130, 132 (indicated by the dashed lines in FIG. 1B) that is generated by the fan 108 in the region between the top side 104 and the receiver 122 when the receiver 122 is placed adjacent to the charging coil housing 102. In some embodiments, the fan 108 is offset horizontally from the charging coil housing 102 in the positive or negative x direction. For example, in some embodiments the fan 108 is offset toward the side of the charging coil housing 102 from which intake cooling airflow is drawn. The fan 108 includes inlets located on a top surface of the fan 108 for drawing intake cooling airflow through the region defined by the top side 104 and the receiver 122 and within a gap created between the charging coil housing 102 and the top side 104. In the embodiment shown in FIG. 1B, fan 108 is a centrifugal fan in which intake cooling airflow is drawn into the fan 108 in the vertical direction (i.e., negative z direction) and exits in a horizontal direction (i.e., negative x direction). The exhaust cooling airflow is exhausted via the exhaust cooling path 132 defined by cooling ducts 110 to a side of the charging coil housing 102 opposite the intake cooling path 130 and then in the region between the top side 104 and the receiver 122. In some embodiments, the intake cooling path 130 also includes cooling ducts for directing airflow to the fan 108. Likewise, in some embodiments the exhaust cooling path 132 does not require cooling ducts 110 but relies instead on the geometry of the coil housing 102 and/or other components included as part of electronics housing 106 to direct cooling airflow along the exhaust cooling path 132. As described in more detail in FIGS. 2A and 2B, the top surface of the top side 104 may include geometry that directs the intake cooling airflow and/or exhaust cooling airflow to maximize cooling. In other embodiments, the top surface of the top side 104 may be planar, or may include other geometries selected to direct cooling airflow as desired. It should be noted, in other embodiments intake cooling airflow may be drawn into the fan 108 in a horizontal direction and exhausted in a vertical direction. In yet other embodiments, an axial fan may be used in which the intake and exhaust air both flow in a horizontal direction or both flow in a vertical direction through the fan.

One of the benefits of this design is that both intake cooling airflow and exhaust cooling airflow provides cooling to wireless power transmitter 100 (including charging coil housing 102) and to receiver 122. This is in contrast with typical designs in which only airflow drawn into the fan is utilized to cool the components. A drawback of this type of prior art design is that it requires separate ducting/exhaust ports that do not aid in cooling the charging components but are required to maintain the desired airflow rate. In addition, the separate ducting/exhaust ports require additional space within the console. Depending on the location of the wireless charger, this may be difficult to implement. In contrast, the embodiment shown in FIGS. 1A and 1B utilizes both the intake cooling airflow and exhaust cooling airflow to cool the wireless charger and does not require any separate exhaust or venting. In addition, intake cooling airflow is drawn from a top portion of the automotive wireless power transmitter 100, which means that the cooling airflow is drawn from within the cabin rather than from a position under the console. Typically, cabin air is environmentally conditioned and is therefore cooler than air drawn from beneath the console where the air is not conditioned. In addition, by positioning the fan 108 adjacent to the control PCB 112 within the electronics housing 106, the vertical height of the wireless power transmitter 100 is decreased as compared with embodiments in which the fan and control PCB are vertically stacked relative to one another. In addition, locating the fan 108 horizontally adjacent to the control PCB 112 allows cooling airflow (either intake cooling airflow or exhaust cooling airflow) to remove heat from the control PCB 112 and integrated controller circuit 114. In some embodiments, thermally conductive material 116 is placed in contact between the cooling duct 110 and the control PCB 112 and/or integrated controller circuit 114 to act as a heat sink for these components. The thermally conductive material 116 allows heat generated by the control PCB 112 and/or integrated controller circuit 114 to be more efficiently transferred to the cooling ducts 110 and removed by the exhaust cooling airflow.

In some embodiments, the top side 104 of the electronics housing 106 and/or charging coil housing 102 include one or more features to prevent fluids or other contaminants from entering into the interior structure of the electronics housing 106. For example, as shown in FIG. 1A the top side 104 of the electronics housing 106 includes a flange or lip 120 that extends vertically (positive z direction) from the top side 104 and prevents fluids spilled onto the top side 104 from flowing into the cooling ducts 110 and/or being ingested into the fan 108. Likewise, in some embodiments the charging coil housing 102 includes an overhang portion 118 that extends from the portion of the coil housing 102 that houses the charging coil. In some embodiments, the overhang portion 118 extends around the entire circumference of the coil housing 102 (i.e., in both the x-direction as visible in FIGS. 1A and 1B and the y-direction, not visible in FIG. 1A or 1B). The overhang portion 118 prevents objects from falling through the gap between the charging coil housing 102 and the top side 104 of the electronics housing 106. When viewed from the top, the one or more overhang portions 118 obscure the components located within the electronics housing 106 (such as the fan 108). In addition, the geometry of the overhang portion 118 can be utilized to direct intake cooling airflow and/or exhaust cooling airflow. In some embodiments, a bottom surface of the overhang portion 118 may be planar. In other embodiments, the bottom surface of the overhang portion 118 may include a geometry for directing intake cooling airflow and/or exhaust cooling airflow along particular path.

Figure 2A:
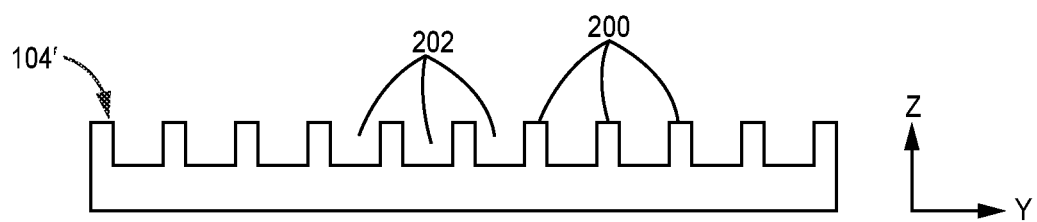
FIGS. 2A and 2B are schematic side views of a housing surface associated with the air-cooled wireless power transmission system according to some embodiments.
Figure 2B:
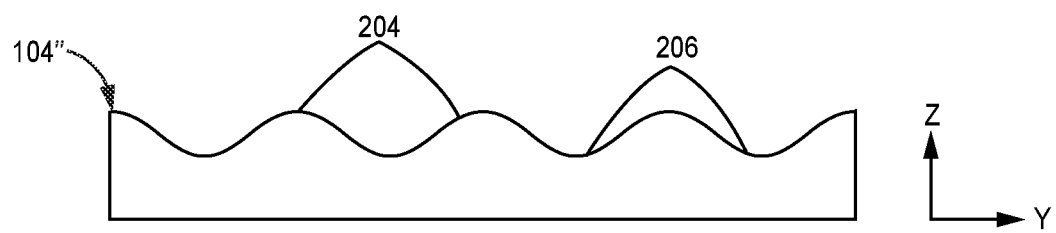

FIGS. 2A and 2B are side views that illustrate exemplary geometries associated with the top side 104' and 104", respectively, of the electronics housing 106 utilized to direct intake and/or exhaust cooling airflow along the respective surfaces. The side views shown in FIGS. 2A and 2B have been rotated 90° along the vertical axis from the views shown in FIGS. 1A and 1B so that cooling airflow is directed into or out of the page. For example, in the embodiment shown in FIG. 2A, the top surface of top side 104' includes a plurality of protrusions 200 separated by gaps or channels 202. In some embodiments, the plurality of protrusions 200 may be allowed to be brought into contact with a bottom surface of the receiver 122, wherein intake/exhaust cooling airflow is provided within the gaps 202 between protrusions 200. Likewise, the top surface of the top side 104" shown in FIG. 2B includes a surface having a wave-like top surface comprising peaks 204 separated by troughs or channels 206. The intake/exhaust cooling airflow is provided within the troughs 206 between the peaks 204. In other embodiments, other geometries may be utilized to further control the route cooling airflow take into or out of the housing. For example, as described above in some embodiments the top surface is simply planar. In other embodiments, other geometries are utilized to direct cooling airflow as desired.

This wireless power transmitter provides the advantages of improved cooling efficiency and optimized packaging space when compared to prior wireless power transmitter designs.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled. As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A wireless power transmitter for charging a receiver, comprising:
    a charging coil housing that houses a charging coil and includes a first top surface, wherein the charging coil wirelessly transmits power to the receiver placed on the first top surface of the charging coil housing;
    an electronics housing for housing electronics and a fan, wherein the electronics housing includes a top side with a second top surface, and the fan is positioned horizontally adjacent to the electronics, wherein the electronics include a printed circuit board and an integrated controller circuit; and
    an exhaust cooling path positioned adjacent to the second top surface of the top side, wherein the exhaust cooling path flows horizontally over the second top surface of the top side.

2. The wireless power transmitter of claim 1, wherein the exhaust cooling path includes a cooling duct.

3. The wireless power transmitter of claim 1, wherein the fan is offset horizontally from the charging coil housing in the positive x direction.

4. The wireless power transmitter of claim 1, wherein intake cooling airflow is drawn into the fan in a vertical direction.

5. The wireless power transmitter of claim 4, wherein intake cooling airflow is drawn into the fan in a negative z direction.

6. The wireless power transmitter of claim 1, wherein the second top surface of the top side includes a plurality of protrusions separated by channels.

7. The wireless power transmitter of claim 6, wherein airflow in the exhaust cooling path is provided within the channels.

8. The wireless power transmitter of claim 1, wherein exhaust cooling airflow is exhausted from the fan in a vertical direction.

9. The wireless power transmitter of claim 1, wherein the electronics housing houses a thermally conductive material.

10. The wireless power transmitter of claim 9, wherein the thermally conductive material is in contact with the electronics and allows heat generated by the electronics to be transferred from the electronics to airflow in the exhaust cooling path.

11. The wireless power transmitter of claim 9, wherein the thermally conductive material is in contact with the top side of the electronics housing.

12. A wireless power transmitter for charging a receiver, comprising:
    a charging coil housing that houses a charging coil and includes a first top surface, wherein the charging coil wirelessly transmits power to the receiver placed on the first top surface of the charging coil housing;
    an electronics housing for housing electronics and a fan, wherein the electronics housing includes a top side with a second top surface, and the fan is positioned horizontally adjacent to the electronics, wherein the electronics include a printed circuit board and an integrated controller circuit; and
    an exhaust cooling path positioned adjacent to the second top surface of the top side, wherein the exhaust cooling path flows horizontally over the second top surface of the top side,
    wherein intake cooling airflow is drawn into the fan in a vertical direction.

13. The wireless power transmitter of claim 12, wherein the exhaust cooling path includes a cooling duct.

14. The wireless power transmitter of claim 12, wherein the fan is offset horizontally from the charging coil housing in the positive x direction.

15. The wireless power transmitter of claim 12, wherein intake cooling airflow is drawn into the fan in a negative z direction.

16. The wireless power transmitter of claim 12, wherein exhaust cooling airflow is exhausted from the fan in a vertical direction.

17. The wireless power transmitter of claim 12, wherein the electronics housing houses a thermally conductive material.

18. The wireless power transmitter of claim 17, wherein the thermally conductive material is in contact with the electronics and allows heat generated by the electronics to be transferred from the electronics to airflow in the exhaust cooling path.

19. The wireless power transmitter of claim 17, wherein the thermally conductive material is in contact with the top side of the electronics housing.

* * * * *